July 26, 1932.  E. A. EVERETT  1,868,739
POWER OPERATED RAIL SAW
Filed May 11, 1927  4 Sheets-Sheet 1

INVENTOR.
Edward A. Everett
BY
ATTORNEY.

July 26, 1932.  E. A. EVERETT  1,868,739
POWER OPERATED RAIL SAW
Filed May 11, 1927  4 Sheets-Sheet 3

INVENTOR.
E. A. Everett,
By
ATTORNEY.

INVENTOR.
Edward A. Everett,
BY
M. A. Loughridge
ATTORNEY.

Patented July 26, 1932

1,868,739

UNITED STATES PATENT OFFICE

EDWARD A. EVERETT, OF NEW YORK, N. Y., ASSIGNOR TO NANDE CORPORATION, OF NEW YORK, N. Y., A CORPORATION OF NEW YORK

POWER OPERATED RAIL SAW

Application filed May 11, 1927. Serial No. 190,567.

This invention relates to a readily movable material dividing machine, particularly to one in which the cutting element may take the form of a toothed member and more especially one in which the cutting element preferably takes the form of what is ordinarily known as a band saw.

A principal object of this invention is to provide a readily movable material dividing machine of the type specified which will be particularly suitable for working especially upon elongated material for the purpose of dividing that material transversely.

A further object of the invention is to provide a machine of the type specified and accomplishing the principal object specified which is preferably constructed so as to readily lend itself to power driving.

A further object of the invention is to provide a machine of the type specified attaining the previous objects particularized which is further so constructed that it is readily and conveniently supportable upon the material being worked.

A further object of the invention is to provide in connection with a machine of the type specified a convenient and readily manually adjustable means for varying the pressure upon the cutting element in the direction of the cut being made.

A further object of the invention is to provide a supporting means for a driven band saw whereby the band saw may be gradually shifted as a whole to different vertical positions but in each of which the band saw will be parallel to each of its former positions.

A further object of the invention is to provide means whereby a readily portable band saw may be supported by a frame which may be conveniently and rigidly temporarily attached to material being worked upon.

Another object of the invention is to provide a portable saw for sawing rails of a railway track which is mounted upon rollers to roll along the track and which has a comparatively low centre of gravity.

Other objects and advantages will appear as the description of the particular physical embodiment selected to illustrate the invention progresses, and the novel features will be particularly pointed out in the appended claims.

Figure 1:
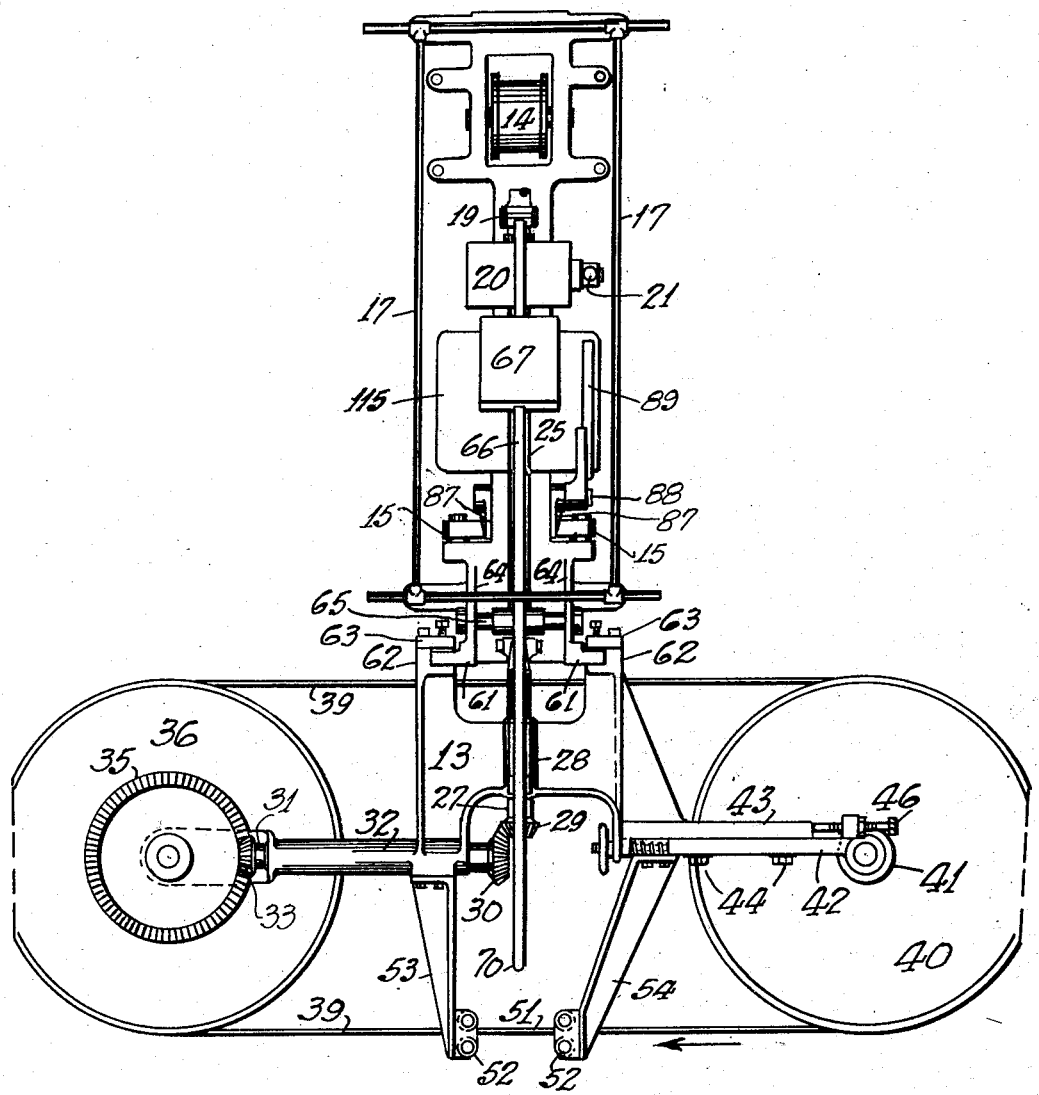
Figure 2:
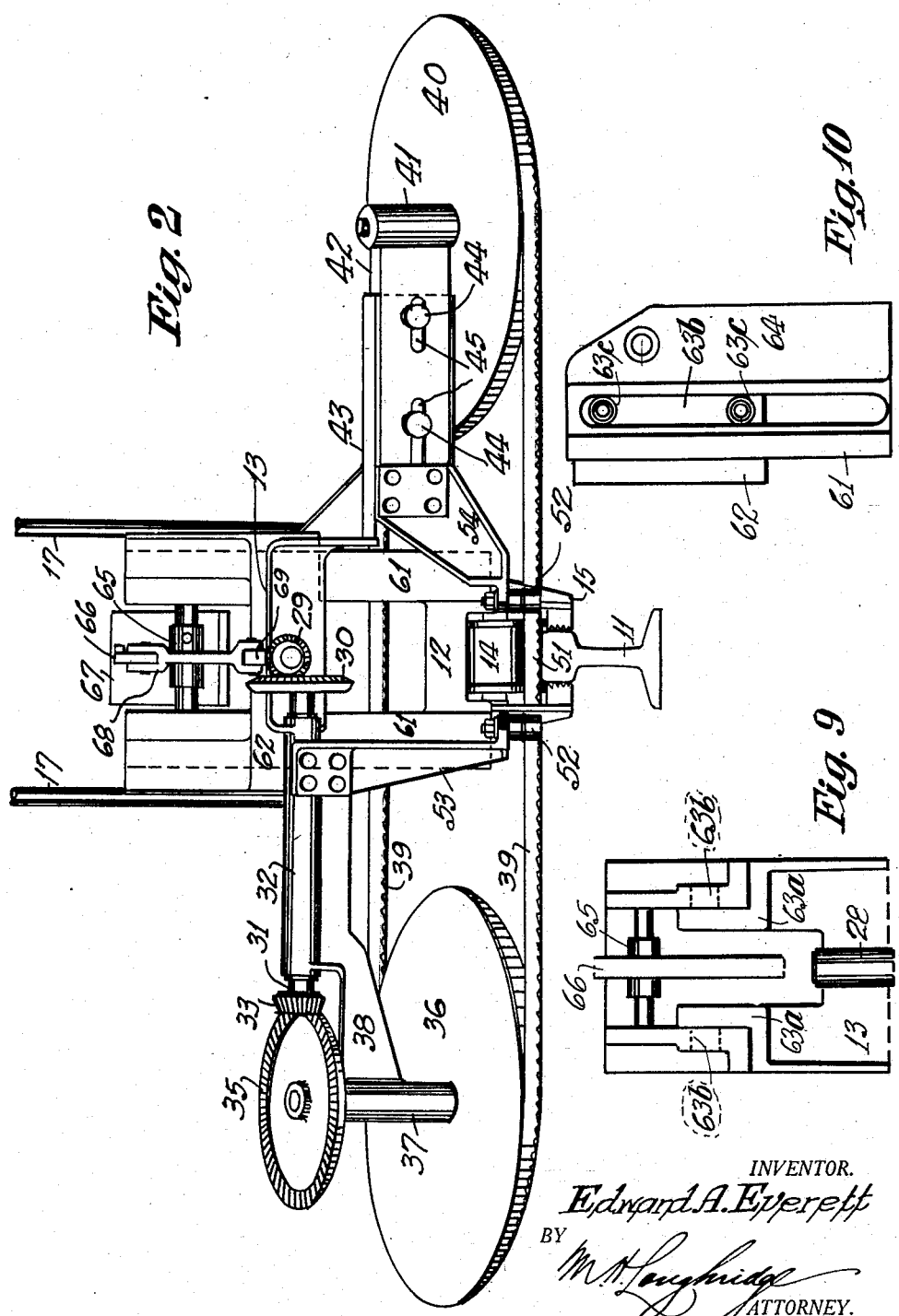
Figure 3:
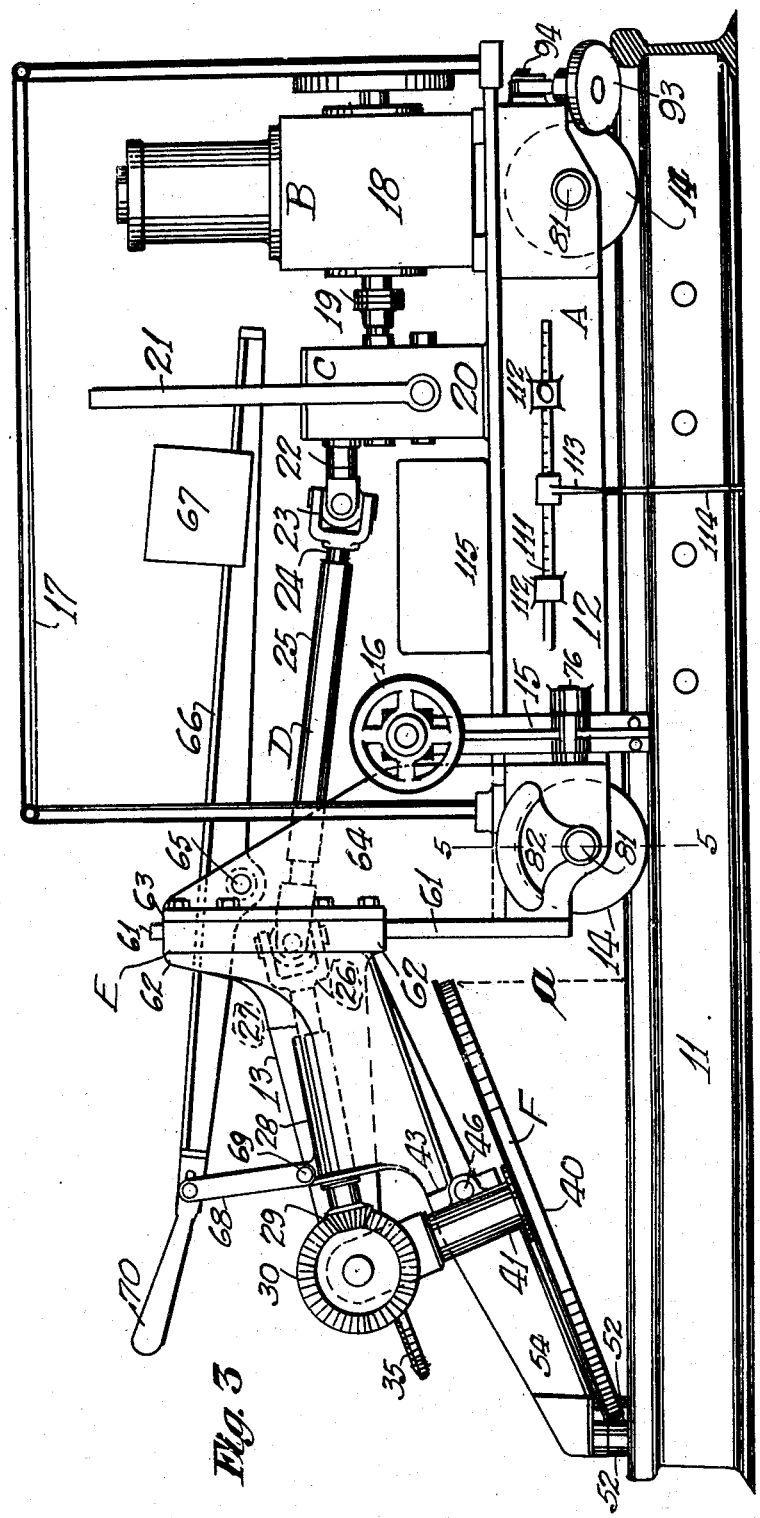
Figure 4:
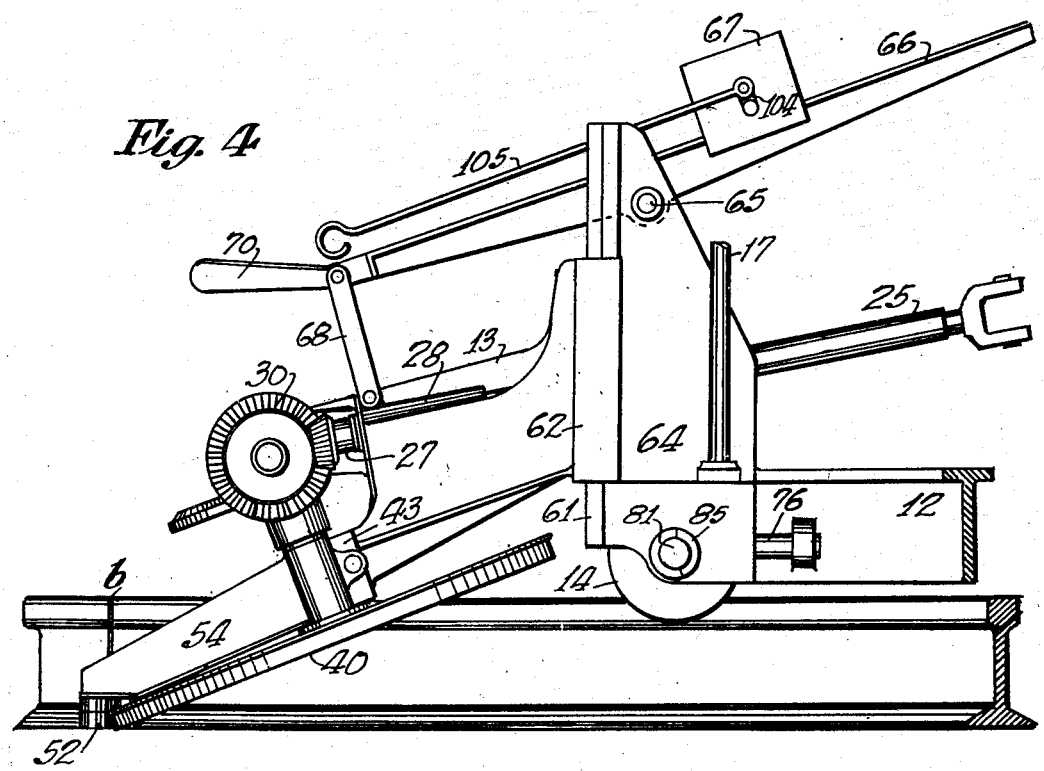
Figure 5:
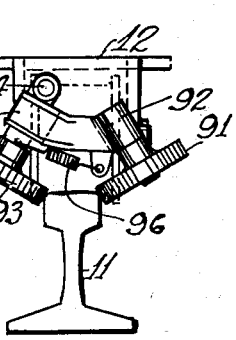
Figures 6, 7:
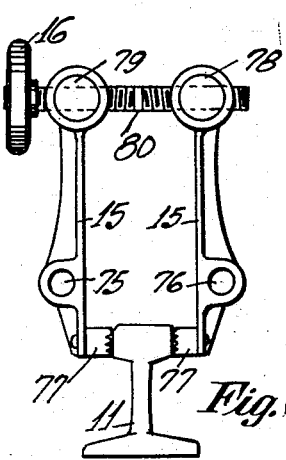
Figure 8:
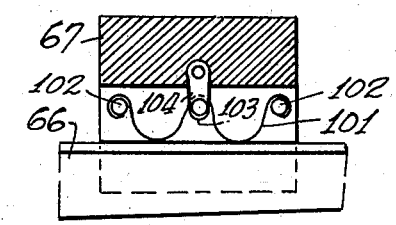

In describing the invention in detail and the particular physical embodiment selected to illustrate the invention, reference will be had to the accompanying drawings, wherein similar characters of reference refer to like parts throughout the several views and in which:

Fig. 1 is a top plan view of a machine embodying my invention but certain parts are omitted to more clearly show the construction; Fig. 2 is a front elevational view of the machine as shown by Fig. 1, viewed from the near end as illustrated in Fig. 1, some parts being omitted and others broken away to more clearly show the construction; Fig. 3 is an elevational view of the machine as shown by Fig. 1, viewed from the right hand side as seen in Fig. 1, and shown in position on material to be divided; Fig. 4 is a fragmentary elevational view of the machine as shown by Fig. 1, viewed from the same position as that from which the machine was viewed as shown by Fig. 2, but showing a different operative position of the parts, particularly the material severing element, which is shown in a position wherein it has just completely severed the material being worked upon; Fig. 5 is a partly elevational and partly cross-sectional view of a detail of the machine, as shown by Fig. 1, and illustrates a supporting or steadying means for the machine when not in use on a piece of material and is taken substantially on the plane indicated by line 5—5 of Fig. 3 with certain parts changed in position; Fig. 6 is a detached detail elevational view of material grippers used by my machine, as shown by Fig. 1; Fig. 7 is a fragmentary and elevational view illustrating mechanism for maintaining the machine of Fig. 1 in alignment with the material being worked upon; Fig. 8 is a fragmentary part elevational and part cross-sectional view illustrating a method of securing a weight which is used in the machine Fig. 1, to exert pressure upon the material severing element; Figs. 9 and 10 illustrate an alternative form of construction which may be used for guiding a slide used in the machine Fig. 1.

The physical embodiment of the invention selected and illustrated in the drawings by which to explain the principle underlying the invention and a preferred construction of one embodiment includes, generally, a frame A having associated therewith supporting means and clamping means for attaching it to the material to be severed; a prime mover B; a speed changing gear C; and a main driving shaft D. The above generally described elements form what might be called the carriage and power generating and transmitting system of a readily movable material dividing machine made in accordance with my invention. In connection with the elements generally described above, there is employed in the preferred form of my invention, a main supporting head E, adapted for reciprocation in a vertical line in the ordinary use of the machine, which head carries the material severing element proper, designated generally by F, and means for driving the material severing element by proper connection to the main shaft D.

The main body portion of the frame of the machine is designated 12 and may be of any suitable or appropriate form, but, it is preferred to use a main body portion of substantially a T section elongated more or less to establish the necessary stability. This main body portion 12 has rollers 14, preferably flanged, journaled thereon, as by shafts 81. This construction permits the frame to be placed upon the top of elongated material and rolled along thereon, thus facilitating the transportation from point to point.

The frame carries means for clamping it to material to be severed. This means may assume various forms, but it has been found best to have a clamping member of the jaw type. One jaw is so positioned as to engage with one side of material to be severed, and the other jaw with the opposite side of the material to be severed. It has further been found that the jaw should not extend too far down on the material to be severed. This is especially true when the material worked upon is rails in place on a railway track, because in such case if the jaws extended down too far, then they will be likely to interfere with fish plates or bolts when the frame is being moved along the trackway on the top of the rail. For the above stated reasons, it has been found best to make the clamping member in the form, as shown in detail in Fig. 6, in which the lever, as 15, is pivoted so as to extend down along side of the material on each side of the material as shown in Fig. 6, one lever being pivoted on a shaft 75 and the other upon a shaft 76. These shafts are carried by the main frame 12. In order to cause the lower ends of the levers 15 to approach one another and thereby clamp material to be severed, means are provided to bring the upper ends of the levers nearer together or farther apart. In the form shown in the drawings, the upper ends of the levers are enlarged, as shown at 78 and 79, and these enlargements are orificed and screw threaded and a right and left hand threaded rod 80 is passed therethrough. The rod 80 is provided with a suitable manually operating means as the hand wheel 16. By suitably operating the hand wheel 16, the upper ends of the levers are caused to approach or recede so unclamping or clamping the material being severed. This hand wheel 16 is positioned in a readily accessible position so as to be manually operated as clearly shown in Fig. 3. If desired, the lower ends of the levers 15 may be provided with replacable jaw members at 77. It is desirable to so construct the device, because in some cases a smooth jaw face is desired, whereas in others a very rough face may be desirable and furthermore, the machine may be used on material of such a degree of hardness that the jaws are readily worn in which case it is desirable to have the device so constructed that it may be readily replaced.

As will be more fully understood as the description progresses, it is necessary in the type of machine being described to prevent a relative transverse movement of the frame and the material being severed. The transverse movement in one direction beyond certain point must be absolutely prevented, whereas relative transverse movement in the other direction, may be allowed within quite wide limits, but should nevertheless be somewhat restrained. In order to insure such desired result, various means might be used, but applicant prefers a form such as has been illustrated in detail in Fig. 7 of the drawings. In this form applicant provides at what might be called the rear end of the body 12, rollers as 91 and 93, one of which is so positioned as to bear preferably upon the upper corner of the material to be severed and the other of which bears upon the opposite upper corner of the same material. The roller 91 is journaled on a shaft which is carried by the journal 92, and bears fixed relation to the main body 12. The roller 93 is journaled on a shaft which is supported on a pivot 94 which in turn is attached rigidly to main body 12. The shaft 97 is embraced by a jaw 95 allowing a limited pivotal movement of shaft 97. The limited movement of shaft 97 is controlled by a resilient means, as spring 96, one end of which is attached to the shaft and the other end of which is attached to the body 12. The construction described is such that the frame 12 can move in one direction only so far as allowed by roller 91, but may move in the other direction a limited amount determined by the size of jaw 95, and even this movement is resiliently controlled by the member 96.

In practice the roller 91 is held by the spring controlled roller 93 against the corner of the material to be severed without lost motion so that the frame is normally rigid laterally when the machine is brought into operation.

When the machine is not positioned on material, it is supported against any tendency to overturn sideways by suitable or appropriate means, but more especially by a device of my invention which includes stabilizing props 82 affixed to the protruding ends of shaft 81, and which it is preferred to make in a shape approximating a quadrant, as this facilitates their proper engagement with a supporting surface. The construction is shown in detail in Fig. 5 in which is also shown a spring 83, coiled about the shaft 81 with one end fixed to main body 12, and the other end fixed to the quadrant like body 82. This spring causes the members 82 to automatically assume the position above shaft 81 when released, that is, to assume the position as shown in Fig. 3. To prevent the quadrants from moving too far shoulder 84 is provided on one of the quadrants, as shown in Fig. 5, to engage a projection 85 of a portion of the main body 12, Fig. 4. It will be noted that the members 82, when in the raised position, clear the head of the rail 11 as indicated in Fig. 3. This places these supports above the level of the running rails and enables the machine, as it is rolled along the track, to pass over crossing frogs and the rails of turnout switches without obstruction.

From the description hereinbefore given it will be readily understood that the frame which applicant has provided is of substantial length, is provided with suitable means whereby it may be moved readily along material to be severed while being supported by that material and that it may be positioned for operation upon said material and clamped firmly in that position so as to have no longitudinal movement, and is held from relative transverse movement in one direction but resiliently to a limited extent in the other direction.

Although applicant contemplates that under certain conditions manual power may be used, nevertheless, he prefers to make use of some prime mover. To this end, applicant has provided a suitable form of prime mover, in this case an internal combustion engine 18. This engine has been positioned upon the top of the T member 12, adjacent the rear end thereof.

It will probably be found desirable in the use of the machine to vary speed at which the material severing element is driven. To this end, applicant prefers to provide a speed changing device 20, also positioned upon the body member 12. The speed changing device is, in the form shown, connected to the engine by a coupling 19.

In the form of the device as shown upon the drawings, applicant employs a main shaft D between the change gear device 20 and the main head E of the universal type, comprising the universal joint 23, connecting shaft 22 of the speed changing device 20 to shaft 24, spline 25, and universal joint 26.

The main head designated as a whole by E in the drawings, comprises the portion 62, which in connection with the strip 63 forms a groove or channel within which are partially embraced the slideways as 61, which are formed as vertical right angle extensions of the main body 12 of the frame. By reason of these channels and slideways 61, the main head E may be reciprocated vertically at a right angle to the material upon which the main body 12 of the frame rests.

Attention is directed to the fact that as the machine is moved from place to place along the track, by rolling it on rollers 14, it is desirable that the centre of gravity be as low as possible; also it is desirable that the machine, for convenience in handling, be as low as possible on the track so that it has a low clearance. The present construction secures this result by placing the mechanism as close as possible to the track and using a drive shaft between the motor and the saw which is parallel with the rail.

In order to conveniently cause a reciprocation of the main head E, I have as a preferred form provided a lever 66 pivoted on a shaft 65, which is journaled in extensions 64 of main body 12. This lever extends forwardly of the machine to a convenient point where it is preferably formed into a handle portion 70, and intermediate the handle portion 70 and the pivot 65, a link 68 is connected thereto which also connects to a forwardly extending portion 13, of the main head E. It is readily understood that a manipulation of the handle 70 will cause a substantially vertical right angle movement of the main head E relative to the material 11 being worked upon.

The pressure of the feed on the cutting member may be regulated by hand through the handle 70, but is also controlled by the shiftable weight member 67 which is so formed that it may slide upon the lever 66 and be moved to and retained in a desired position which will be suitable for causing the main head E to be at the proper vertical height for the conditions encountered in transporting and utilizing the machine. In order to not only properly maintain the weight 67 in an adjusted position, and to allow it to be readily moved to other positions, applicant prefers to use a device which includes a pivoted crank arm 104, Fig. 8, together with a double bent resilient member 101, the ends of which are carried around and suitably secured to pins 102 positioned on the weight 67. This double bowed resilient member 101 passes around and above the eccentric shaft 103 of the crank arm 104, and to this is attached the manually operable link 105. The link 105 has its end so disposed as to be within easy reach of the person operating handle 70. By pushing or pulling upon link 105, the bowed member 101 will be raised by the eccentric 103 with lever 66 and, at the same time, the weight 67 will be shifted along the lever 66 in one direction or the other, in accordance with whether a pull or push is given to the link 105. When the required movement has been made, the resilient member 101 by bearing upon the member 66, will maintain the weight 67 in the adjusted position. This weight may be positioned at the extreme right hand end of the lever 66, as viewed in Fig. 4, in which case the main head E will be maintained in its upper position. The weight 67 may be positioned to the left of the pivot 65 as viewed in Fig. 4, to a greater or less extent, so that the pressure exerted thereby upon the material severing element F will vary to a greater or less extent. This weight 67 provides a most convenient method by which the pressure upon the material severing element F may be readily varied and be made to accord with that desired in accordance with the nature of the work to be performed by the material severing element.

The main head E supports the main head drive shaft 27 in the sleeve 28 formed integral with frame 13 to the shaft 24 and having the universal connection 26 on one end and the bevel gear 29 on the other end thereof. The bevel gear 29 meshes as best shown in Fig. 2, with the bevel gear 30 mounted on a shaft 31 in a bearing 32 and having a bevel gear 33 on the other end thereof meshing with bevel gear 35 mounted on a shaft journaled in bearing 37 supported by arm 38 and this shaft has a drive pulley 36 connected at the other end thereof.

The drive pulley 36 has passing about a portion of its peripheral surface the ribbon like material dividing element 39 which is preferably toothed as shown and corresponds in the form shown to the ordinary and well known so called band saw. This band saw passes about pulley 36, and also about pulley 40, mounted on a shaft journaled in bearing 41. The pulleys 36 and 40 are, as shown, spaced an appropriate distance apart and both lie in the same plane, and that plane in the position of the machine as shown by Fig. 3, is inclined to the horizontal and cuts the horizontal in one line only, which line is parallel to a line transversely at a right angle to the longitudinal center line or axis of the material, as 11, being worked upon. The inclination of the plane in which pulleys 36 and 40 lie, may be varied in machines as desired, but the inclination must be such, that the distance a, as shown in Fig. 3, is at least equal to the vertical depth of the material severed.

As the pulleys 36 and 40 lie at an angle to the horizontal, and as the ribbon like material severing element 39, is very thin, it also is at such an angle that it must be made to move vertically edgewise at the points where it comes in contact with the material to be severed. To cause the member 39, Fig. 1, to assume substantially a vertical right angle position, as regards the material 11 to be severed, the guides 52 are provided attached to the members 53 and 54 forming a portion of the main head E.

In order to provide a necessary adjustment so that the centers of pulleys 36 and 40 will be the proper distance apart, I have mounted pulley 40 in a bearing 41 carried by arm 42 which has slots 45 therein through which the bolts 44 pass to and through the arm 43 fixedly attached to the main head E. By means of the bolts 44, I provide that arm 42 may not separate sideways from the arm 43. In order to adjust a relative engagement lengthwise of arms 42 and 43, I provide the screw adjustment as 46.

Although my material severing device is of a general application for severing portions of elongated material, upon which the machine may be supported, nevertheless, I have especially in mind the severing of the battered ends of railway rail, that is, the "cropping" so-called of rail. For this purpose, it is desirable to have a convenient means for accurately ascertaining the distance from the material severing element 39, at the point where it would start to sever when depressed to the end of the rail. I provide such a device by the rod 111 supported by the members 112 carried by the main body 12, in connection with the pointer 113 carried by the rod 111. The distance of pointer 113 from the working edge of the material severing element 39, may, within the limits of the rod, accurately gauge the amount to be severed measured from the abutting rail ends 114.

It will be observed from Fig. 3 that the upward thrust from the saw is transmitted obliquely to the vertical slides 61 which has a tendency to cause binding of the head E on the slides. This condition may be somewhat improved by bringing the slides as close as possible to the cutting point and to further this end the end of the frame A with the vertical slides may be arranged to project above and over the inner edge of the saw toward the cutting point.

The slide construction in Figs. 9 and 10 includes a ball bearing construction in which the parts 64 are provided with parallel slots 63b in which the spaced ball bearings 63c are located and connected by studs to the members 63a of the head 13. The thrust from the cutting tool is transmitted to the ball bearings which slide freely in the slots.

In Fig. 1 a cam arrangement is shown alternative to the screw of Fig. 6 for operating the clamping members 15—15. This comprises cams 87 mounted on shaft 88 and operated by the lever 89 to bring the members 15 to the engaging position or to released position. The tank 115 is balanced on top of frame A and carries the lubricating compound which is supplied to the cutting point by a flexible metallic hose not shown in the drawings.

Applicant has provided a convenient railing 17 about the parts mounted on the main frame 12 which serves not only to protect these parts, and prevent workmen from carelessly getting entangled therewith, but also serves as a most convenient hand hold by which the machine as a whole may be guided and pushed along material to be severed or used in lifting a machine about when not on material to be worked upon.

From the hereinbefore described construction and method of operation, it can now be well understood that applicant has provided a frame which, provided with rollers or similar anti-friction devices, may be readily moved along a fairly uniformed surface and especially along elongated material lying substantially in a horizontal plane. That the frame is provided with a conveniently situated and operable manually controlled clamping device which when properly operated, serves to prevent the frame from moving longitudinally with respect to material being worked upon, and that this clamp contacting with the material to be severed, only adjacent its upper face is therefore of such a nature that when the machine is used for severing a rail in place on the track, that the clamp will not come in contact with fish plates and bolts holding the fish plates to the rails. It will further be understood that when the material severing element is being driven and is actually in contact with the material, that the pivoting movement about the clamp 15 caused thereby, would be resisted absolutely by the roller 91, so that there will be obviated an otherwise present tendency for the machine to wobble and so distort the cut or cause the ribbon or saw to bind or perhaps break. On the other hand, when the machine is not being used to make a cut, but is being rolled along the material, the rear end is substantially in alignment with the material, by reason of the fact that the rear end can move transversely to the material only to the extent allowed by roller 93 and this movement is resiliently controlled by the spring 96, so that when moving the machine along the rail, it will maintain itself by means of the flanges on the rollers 14 and the rollers 91 and 93 substantially in alignment with the rail, but will still have a sufficient relative transverse movement so that it will not unduly bind due to inequalities to be met with.

The provision of a change speed gearing as C, controlled by a handle as 21, enables the driving of the material severing element at varying speed in accordance with the kind of material being severed. It also provides for varying speeds necessitated by the difference in cutting speed between the hard outer surface, such as that of the face of a steel rail, and the relatively softed inner material, so that by changing the speed, which may readily be done by an operation of the handle 21, in the ordinary and well known manner, in connection with a proper adjustment of the weight 67, a proper speed and pressure for cutting various materials may be secured. For instance, in cutting a steel rail, the initial cut would be made at low speed and heavy pressure. After the skin or outside surface has been severed, then the speed could be increased and the pressure relieved, all by two simple manual motions, one by shifting the lever 21, the other by manipulating the link 105.

It will be observed, particularly by referring to Fig. 1, that the whole machine is built preferably substantially symmetrically on a center line parallel with the longitudinal axis of material to be severed. In designing the several parts and positioning the same upon the frame, the endeavor is made to have the whole machine so symmetrically arranged on that center line that the machine will be substantially balanced so that the center of gravity will substantially lie in substantially a line at a vertical right angle to the longitudinal center line of material to be severed. By so constructing the machine, great facility will be obtained in transporting the machine not only on the material to be severed, but also in other cases, and furthermore, the machine when in use actually making a cut will have a greater stability and will exert a less pressure on the clamping and holding means than otherwise would be the case, so that the accuracy of the cut will be much improved and danger to the saw by binding or distortion will be avoided.

Although I have described and illustrated one particular physical embodiment only of my invention, and have explained the construction, operation and principle thereof, nevertheless, I desire to have it understood that the form selected is merely illustrative, but does not exhaust the possible physical embodiments of the idea of means underlying the principle of my invention.

What I claim as new and desire to secure by Letters Patent of the United States, is:

1. In a support for a material severing element, the combination with a frame of means bearing on material to be severed and supporting the frame and means for entirely preventing relative transverse movement of the frame and the material in one direction beyond a certain point and allowing limited resiliently controlled transverse movement in the other direction together with means for preventing longitudinal movement between the frame and the material to be severed; a material severing element supported by the frame; means for advancing the severing element to and through and retracting it from the material to be severed, and means for driving the severing element.

2. In a material severing machine, in combination: a frame positioned lengthwise and above material to be severed; means for supporting the frame on material to be severed; two clamping levers, each pivoted on the frame and depending one on one side of the material and the other on the other side of the material and having portions extending above their pivots; means for varying the distance between the upper ends of the levers, whereby the lower ends may be caused to clamp the material, a roller; an inclined shaft journaled on the frame supporting the roller so that the roller bears against the upper corner of the material; another roller similarly but reversely positioned so as to bear on the opposite upper corner of the material, said last named roller being journaled on a shaft formed with a pivot supported by the frame at its upper end so that the frame may approach or recede from the material and resilient means for drawing the last named roller into contact with the material whereby the frame is held firmly but resiliently in alignment with the material against transverse movement in one direction but is held absolutely against transverse movement beyond a certain amount in the other direction; a material severing element supported by the frame; means for advancing the severing element to and through and retracting it from the material to be severed, and means for driving the severing element.

3. In a power operated band saw for sawing the rail of a railway track, the combination of a saw head, a pair of band saw wheels equally spaced from and supported by said head, a band saw supported in operative position with its cutting edge horizontal by said wheels, a motor, a shaft driven by said motor parallel with and above the band saw, a flexible drive above the band saw between said shaft and one of said band saw wheels, means providing for the vertical motion of said head to bring the saw to the work, the support for said band saw wheels being above the plane of the cutting edge of the saw.

4. In a power operated band saw for sawing the rails of a railway track, the combination of a saw head and a supporting frame mounted on one rail of the track, a pair of band saw wheels equally spaced from and supported by said head, a band saw supported in operative position with its cutting edge horizontal by said wheels, a drive shaft parallel with and located above the band saw, means for driving one of said wheels by said drive shaft and vertical guides for said saw head whereby the saw is moved to the work, the cutting edge of said saw being disposed below the plane of said saw head.

5. In a power operated rail saw, the combination, a main frame mounted upon rollers to roll along one rail of the track, a motor mounted upon said frame, a saw frame movably mounted on said main frame, a band saw with its cutting edge transverse to the rail mounted upon said saw frame and means operatively connecting said motor with said band saw.

6. In a power operated rail saw, the combination, a main frame mounted upon rollers to roll along one rail of the track, a motor mounted upon said main frame, a saw frame adjustably mounted on said main frame, a band saw operatively mounted on said saw frame with its cutting edge at right angles to the rail and arranged to operate upon the rail and a flexible drive operatively connecting said motor with said band saw.

7. In a saw for sawing the rails of a railway track, the combination, a main frame mounted upon rollers to roll along the track, a motor on said frame, a clamp comprising a pair of members pivoted to said main frame and arranged to clamp opposing sides of the rail, a saw frame adjustably mounted on said main frame, a band saw mounted on said saw frame with its cutting edge horizontal and below the opposite edge at right angles to the rail and in operative relation to the rail and a flexible shaft operatively connected with said motor and parallel with the rail and above the band saw for driving said band saw.

8. In a machine of the type described, the combination, a frame mounted upon rollers to roll upon one rail of a railway track, a motor mounted upon said frame, a tool associated with said frame and operatively connected with said motor for operating upon the rail and means for holding said machine in an upright position when it is removed from the track comprising a shaft projecting at right angles to said frame with a quadrant shaped member pivotally mounted by said shaft, said member being rotatable on its mountings to bring it into the active position.

In testimony whereof I affix my signature.

EDWARD A. EVERETT.